United States Patent [19]
Davis

[11] Patent Number: 5,244,603
[45] Date of Patent: Sep. 14, 1993

[54] ENHANCED GAS-LIQUID MIXING UNDER VARIABLE LIQUID OPERATING LEVEL CONDITIONS

[75] Inventor: Robert B. Davis, Nyack, N.Y.

[73] Assignee: Praxair Technology, Inc., Danbury, Conn.

[21] Appl. No.: 914,333

[22] Filed: Jul. 17, 1992

[51] Int. Cl.⁵ .............................................. B01F 3/04
[52] U.S. Cl. ........................................ 261/87; 261/93
[58] Field of Search ..................................... 261/87, 93

[56] References Cited

U.S. PATENT DOCUMENTS

| | | | |
|---|---|---|---|
| Re. 32,562 | 12/1987 | Litz | 261/91 |
| 2,041,184 | 5/1936 | Isenhour | 261/87 |
| 2,628,827 | 2/1953 | Daman | 261/87 |
| 2,800,315 | 7/1957 | Griesbach | 261/87 |
| 3,400,051 | 9/1968 | Hotschneider | 261/87 |
| 4,290,885 | 9/1981 | Kwak | 261/87 |
| 4,919,849 | 4/1990 | Litz et al. | 261/36.1 |
| 5,009,816 | 4/1991 | Weise et al. | 261/87 |

FOREIGN PATENT DOCUMENTS 1093699  5/1955  France ................................ 261/87

*Primary Examiner*—Tim Miles
*Attorney, Agent, or Firm*—Alvin H. Fritschler

[57] ABSTRACT

A gas-liquid mixing system employs an impeller/draft tube assembly submerged in liquid. Hollow eductor tubes affixed to the impeller drive shaft are used to flow gas from an overhead gas space to the liquid in the vicinity of the assembly. The positioning and size of the eductor tubes are such as to maximize the desired gas-liquid mixing and reaction rate.

22 Claims, 1 Drawing Sheet

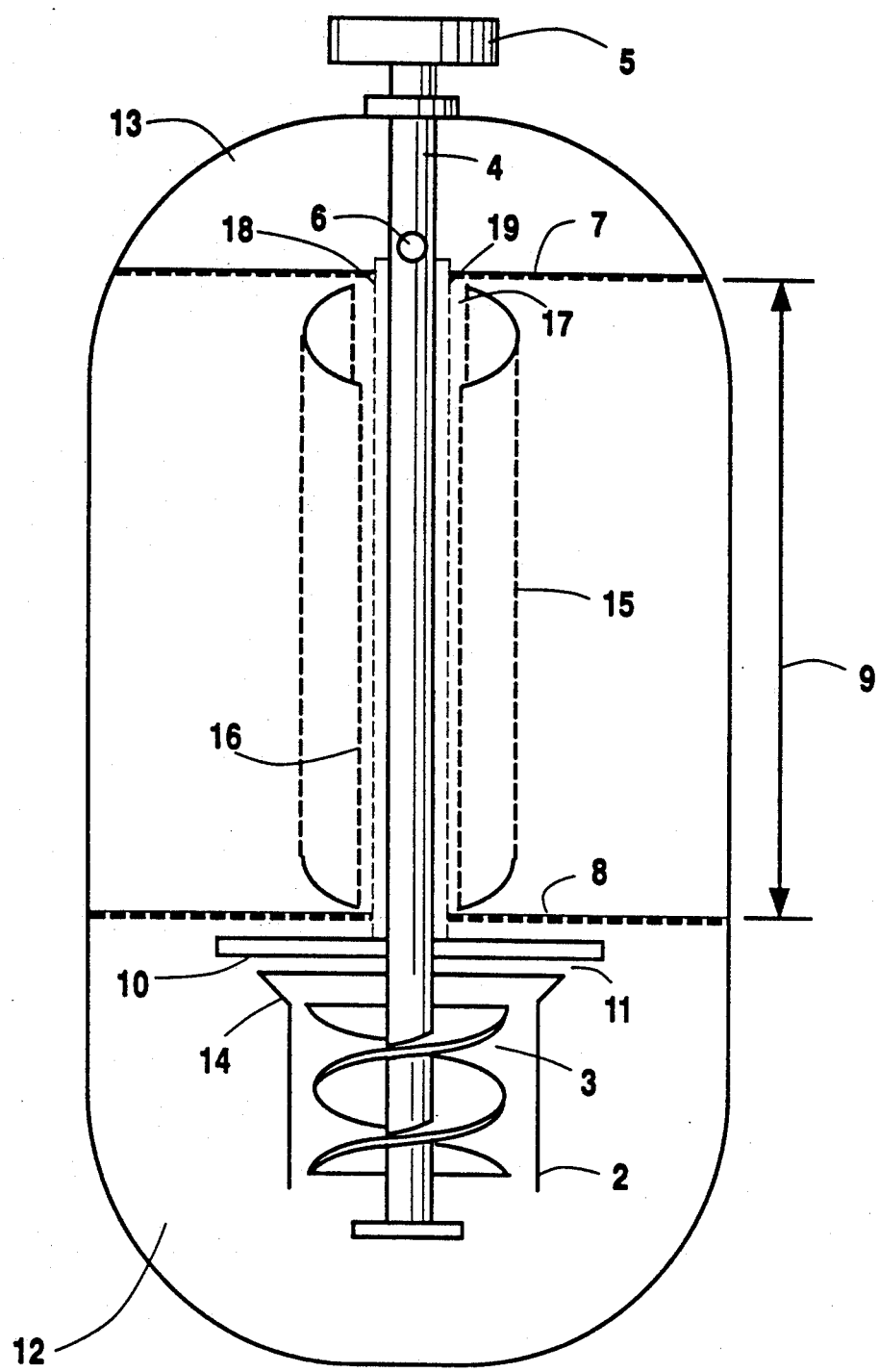

ENHANCED GAS-LIQUID MIXING UNDER VARIABLE LIQUID OPERATING LEVEL CONDITIONS

BACKGROUND OF THE INVENTION

1. Field of the Invention

The invention relates to gas-liquid mixing operations. More particularly, it relates to enhanced gas-liquid mixing under particular variable liquid level operating conditions.

2. Description of the Prior Art

In gas-liquid mixing operations, the Advanced Gas Reactor (AGR) system employs a down-pumping impeller positioned within a hollow draft tube in a mixing vessel to create a recirculating flow pattern in a body of liquid contained in the vessel. Because of such recirculation of the liquid downward in the hollow draft tube and upward in the vessel outside said draft tube, vortices are formed in the upper inlet area of the draft tube so as to draw feed gas from an overhead gas space within the vessel into the recirculating liquid passing downward into the draft tube, as disclosed in the Litz patent, U.S. Pat. No. Re. 32,562.

Satisfactory vortex development for such gas-liquid mixing purposes depends, among various practical operating factors, on the maintaining of a proper liquid level above the top of the draft tube. If the liquid level were to rise above this operating level, the formation of vortices would be impeded, and the gas ingestion rate would decrease essentially to zero. Thus, operating at liquid levels above the optimum level can substantially reduce the gas ingestion capabilities of the AGR system. If the liquid level falls below the top of the draft tube, all pumping action ceases.

In gas-liquid mixing operations subject to non-optimum liquid levels, therefore, the effectiveness of the AGR system can be seriously impaired. In the Litz patent, U.S. Pat. No. 4,919,849, the use of hollow gas ingestion tubes connected to a hollow shaft are disclosed as a means for drawing gas into downward pumping helical impeller means positioned in the hollow draft tube and located at non-optimum liquid levels during the course of gas-liquid mixing operations subject to variable liquid level operations.

In many gas/liquid mixing applications, particularly those in the specialty chemical and pharmaceutical areas, variations in liquid level within a vessel are very common. They may be caused by variations in the batch size processed, an increase or decrease in the volume of reactants, or the addition or removal of material as the reaction proceeds. In many processes, it is desirable to be able to recirculate a gas or gases that accumulate in the vessel head space. This is particularly the case of hydrogenation and oxygenation processes. While the above-indicated Litz patent, U.S. Pat. No. 4,919,849, addresses this matter and provides for the drawing of gas from the overhead gas space in circumstances in which the vortex development of an AGR system, and thus gas ingestion, is impeded, further improvements are desired in the gas-liquid mixing art. In particular, it is desired to provide for enhanced gas-liquid mixing in reactor vessels having very large liquid variations, e.g., as much as 8 feet or more, during the course of gas-liquid mixing operations.

It is an object of the invention, therefore, to provide an improved system for gas-liquid mixing subject to variable liquid operating level conditions.

It is another object of the invention to provide a system to maximize gas-liquid mixing and reaction rates under variable liquid level conditions.

It is a further object of the invention to provide a gas-liquid mixing system for optimizing the use of hollow gas ingestion tubes for a totally submerged helical impeller/draft tube assembly.

With these and further object in mind, the invention is hereinafter described in detail, the novel features thereof being particularly pointed out in the appended claims.

SUMMARY OF THE INVENTION

The location and geometry of hollow gas ingestion tubes are matched with the gas requirements of the helical impeller of an AGR system to maximize gas-liquid mixing and reaction rates. In a totally submerged helical impeller/draft tube AGR assembly, all of the gas is desirably ingested into the draft tube where the reaction rate is highest.

BRIEF DESCRIPTION OF THE DRAWING

The invention is hereinafter described with reference to the accompanying single-figure drawing comprising a schematic side elevational view of a variable level gas liquid mixing system of the invention.

DETAILED DESCRIPTION OF THE INVENTION

The objects of the invention are accomplished by employing hollow gas ingestion tubes, i.e., eductors, desirably positioned and with a geometry such as to enable an impeller/draft tube system to efficiently provide desired gas/liquid mixing in a reactor vessel subject to large variations in liquid level during the mixing operation. Liquid level variations of as much as 8 feet or more can be tolerated in the practice of the invention.

A downward pumping helical impeller is positioned in a hollow draft tube having open ends at the top and bottom thereof as in conventional AGR systems. The draft tube is positioned in the lower half, preferably in the lower third of the reaction vessel. The bottom of the draft tube, however, is located no closer than three quarters (¾) of a draft tube diameter in length above the bottom of the reaction vessel, and preferably one diameter in length above the bottom of the reactor vessel.

In the embodiment shown in the drawings, reaction vessel 1 has draft tube 2 thus positioned in the lower portion thereof. Impeller means 3 is positioned in such draft tube 2 and is driven by drive shaft 4 extending upward through reaction vessel to drive motor 5 positioned above said reaction vessel. For purposes of the illustrated embodiment of the invention, drive shaft 4 is a hollow shaft having gas inlet means 6 in the upper portion thereof above the maximum liquid level 7 to be encountered in the course of gas-liquid operations in the reaction vessel. The lower liquid level within said reaction vessel 1 is indicated by the numeral 8, with the difference between lower liquid level 8 and maximum liquid level 7 representing the liquid level variation 9 encountered in the course of gas-liquid operations using the mixing system of the invention.

In the embodiment illustrated in the drawing, two eductor tubes 10 and 11 are affixed to hollow drive shaft 4 and are in fluid communication with the inner portion thereof. As said eductor tubes are hollow tubes that extend radially outward from hollow drive shaft 4 into the body of liquid 12 in reaction vessel 1, gas communication is established from overhead gas space 13 in reaction vessel 1, through said hollow drive shaft 4 and eductor tubes 10 and 11, to said body of liquid 12. Upon rotation of said eductor tubes, gas is drawn from the overhead gas to the eductor tubes and is discharged therefrom into the body of liquid in the region above draft tube 2.

Eductor tubes 10 and 11 are spaced 180° apart and are located at a distance of $\frac{1}{4}$ to $1\frac{1}{4}$ times the diameter of the draft tube above the top of the draft tube. Preferably, the eductors are located from $\frac{1}{2}$ to 1 diameter above the top of the draft tube. It will be noted from FIG. 1 that the impeller-draft-tube assembly located in the bottom portion of reaction vessel 1, as indicated above, is totally submerged below lower liquid level 8. Likewise, eductor tubes 10 and 11 are so positioned below said lower liquid level 8.

The eductor tubes extend outwardly to a end-to-end length, i.e., from the outer end of eductor tube 10 on one side of hollow drive shaft 4 to the outer end of eductor tube 11 on the outer side of said drive shaft, of from $\frac{1}{2}$ to $1\frac{1}{4}$ times the diameter of draft tube 2, preferably 1 to $1\frac{1}{4}$ times said diameter of the draft tube. In this regard, it will be noted that draft tube 2 is illustrated in the drawing as having an outwardly extending conical section 14 at the top thereof to facilitate the flow of gas bubbles and liquid into the draft tube. The diameter of the draft tube, as referred to above, generally refers to the diameter of the main body of draft tube 2 rather than to the outer diameter of the optional conical section. If such a conical section is employed, however, it is generally desirable for the total end-to-end eductor length to be equal to the large outer diameter of the conical section. The eductor tubes are typically fabricated from standard sizes of extra heavy wall pipe, with the outside diameter of said eductors being generally between about 1/17 and 1/19 the diameter of the draft tube although other sizes can also be employed in the practice of the invention.

The drawing also illustrates the positioning of a split draft tube 15 in the region of reaction vessel 1 subject to liquid level variation 9. This optional feature of the invention is advantageous for incorporation in tall reaction vessels, i.e., those having a relatively large height as compared to the diameter thereof. In the illustrated embodiment, split draft tube 15 has two axial, upwardly extending openings or splits 16 and 17 on opposite sides of the draft tube. It is within the scope of the invention to provide any convenient number of such axial, upwardly extending splits, or to provide other forms of openings so as to enable upwardly flowing liquid to pass into the interior of said split draft tube for recirculation downwardly therein, facilitating the circulation of liquid throughout the reaction vessel. Thus, liquid flowing upward in reaction vessel 1 outside draft tube 2 and past eductor tubes 10 and 11 will tend, in the course of its further upward movement, to pass through splits 16 and 17 of split draft tube 15 for recirculation downward to the vicinity of draft tube 2, from which it is drawn through said draft tube 2 under the influence of impeller means 3. If the height of reaction vessel 1 is not particularly large as compared to the diameter thereof, those skilled in the art will appreciate that there is little or no advantage to incorporating an optional split draft tube in the system of the invention.

In the practice of the invention, it is generally desirable to rotate the eductor tubes so as to achieve a tip speed at the ends thereof of between 1,500 and 3,000 FPM. For many applications, said top speed is preferably from about 2,000 to about 2,400 FPM.

Those skilled in the art will appreciate that various changes and modifications can be made in the details of the invention, as herein described and illustrated, as herein described and illustrated, without departing from the scope thereof as set forth in the appended claims. Thus, more than the two illustrated eductor tubes can be applied to hollow drive shaft 4 at the predetermined location above the draft tube. Such eductor tubes are generally spaced at equal angles around the draft tube, so that three such inductor tubes would generally be spaced 120° apart, while four such eductor tubes would generally be spaced 90° apart. It is also within the scope of the invention to position eductor tubes at more than one height above the draft tube, although by the matching of the location and size of the eductor tubes relative to the liquid pumping, helical impeller/draft tube assembly, desirable gas-liquid mixing and reaction rate can be achieved without using multiple level eductor tubes. In any event, the invention enables essentially all of the gas to be ingested into the draft tube, where the highest reaction rate occurs. It is also within the scope of the invention to establish fluid communication between the outwardly extending eductor tubes and hollow conduits affixed to the outer surface of the impeller device shaft, which can be solid in this instance, with said hollow conduits extending upward into the overhead gas space to thus establish fluid communication between the overhead gas space and said eductor tubes. In the drawing, such hollow conduits affixed to the outer surface of the impeller drive shaft are illustrated by conduits 18 and 19 affixed to drive shaft 4.

It should be noted that, in the practice of the invention, a sparger ring will typically be provided below the draft tube for gas introduction purposes. The sparger ring will typically have a diameter the same as that of the draft tube, with appropriate holes pointing downward for said gas introduction purposes.

In the practice of the invention, it is generally desirable for the ends of the eductor tubes to be cut at an angle trailing back from the direction of gas flow in said eductor tubes. Such angle of art, which serves to facilitate the flow of gas from the eductor tubes into the body of liquid in the reaction vessel, is generally from 30° to 90°, preferably about 45°.

The invention has been described particularly with reference to conventional gas-liquid mixing operations, e.g., hydrogenation of organic liquids or the oxygenation or chlorination thereof, in which variable liquid levels may cause non-optimum operation of an AGR system. The hydrogenation of nitrobenzene to form analine, with by-product water, is a typical example of such circumstance. It should be noted that the invention can be extended to other processing operations. For example, in applications in which an inert or expensive gas, e.g., nitrogen, is injected into a solids-containing liquid to separate the solids from the liquid by flotation, it is advantageous to be able to recirculate gas from the head space, as provided herein, for mixing with a body of solids-containing liquid, when coupled with an efficient liquid pumping system.

Those skilled in the art will appreciate that any suitable axial flow down-pumping impeller means can be employed to create the desired downward flow of liquid in the draft tube with resulting vortex formation to draw a gas bubble-liquid mixture into the draft tube for enhanced mixing therein. While helical impellers, typically with a single or double helix configuration, are generally preferred, marine impellers or other commercially available axial flow impellers can also be employed. Various baffle means can also be included in the reaction vessel to facilitate the desired circulation of liquid upward in the annular space between the impeller-containing draft tube and the walls of the reaction vessel and into the upper split draft tube if such is employed in particular embodiments of the invention. The components of the system can be made of any conventional, conveniently available materials compatible with the contemplated gas-liquid mixing operation to be carried out therein. Thus, various metal alloys, plastics and glass materials may be employed in particular applications. Representative examples of suitable materials include stainless steel, rubber coated steel, titanium and the like.

The invention will be seen from the description above to enable AGR processing operations to be desirably carried out in applications in which non-optimum, variable liquid levels in the reaction vessel inhibit proper vortex development and desired gas ingestion from the overhead gas space into the liquid in the reaction vessel. The invention, which is particularly desirable where it is desirable to recirculate valuable head space gas back into the liquid, extends the range of application to which the highly desirable AGR technology is applicable. The invention thus enhances the use of AGR technology to desirable processing operations in which hydrogen, oxygen, chlorine or other industrial gases are to be mixed with liquids over a broad range of liquid level conditions within the reaction vessel.

I claim:

1. An improved system for mixing a gas and a liquid in a mixing vessel under circumstances in which the depth of a body of the liquid changes over the course of the mixing operation comprising:
   (a) a mixing vessel for the mixing of a gas and liquid;
   (b) an assembly comprising a hollow draft tube with axial flow, down-pumping impeller means positioned therein for vortex development and the injection of a gas bubble-liquid mixture for downward passage through the draft tube, said assembly being positioned within the mixing vessel with the impeller means positioned entirely in the lower half thereof, with the bottom of the draft tube being no closer than about $\frac{3}{4}$ of a diameter of said draft tube above the bottom of the mixing vessel, said assembly being positioned below the lowest liquid level to be encountered during the gas-liquid mixing operation;
   (c) drive shaft means extending upward through the mixing vessel and adapted for rotating the impeller means of said assembly to create a circulation of a gas bubble-liquid mixture downward through said hollow draft tube, with discharge of the gas bubble-liquid mixture from the bottom end of the draft tube for passage upward in the annular space between the draft tube and the wall of the mixing vessel;
   (d) at least two hollow eductor tubes extending radially outward from said drive shaft means into the body of liquid in the mixing vessel above said assembly, said hollow eductor tubes being spaced apart and located at a distance of $\frac{1}{4}$ to $1\frac{1}{2}$ times the diameter of the draft tube above the top of the draft tube, said hollow eductor tubes having a total end-to-end length from the outer end of one hollow eductor tube to the outer end of another of from $\frac{1}{2}$ to $1\frac{1}{2}$ times the diameter of the draft tube; and
   (e) conduit means for providing fluid communication between said hollow eductor tubes and the overhead gas space above the surface of the body of liquid in the mixing vessel at a location above the highest liquid level to be encountered during the gas-liquid mixing operation, whereby efficient gas-liquid mixing is maintained under variable liquid operating level operations with desirable recirculation of gas from the overhead gas space into the body of liquid.

2. The system of claim 1 in which the assembly is positioned in the lower third of the mixing vessel.

3. The system of claim 1 in which said hollow eductor tubes are located at a distance of $1\frac{1}{2}$ to 1 times the diameter of the draft tube above the top of the draft tube.

4. The system of claim 1 in which said hollow eductor tubes have a total end-to-end length from the outer end of one hollow eductor tube to the outer end of another of from 1 to $1\frac{1}{4}$ times the diameter of the draft tube.

5. The system of claim 1 in which said drive shaft means comprises a drive shaft having a hollow portion extending from above the highest liquid level to be encountered during the gas-liquid mixing operation to the position of said hollow eductor tubes, said hollow portion comprising the conduit means for providing fluid communication between said hollow eductor tubes and the overhead gas space of the surface of the body of liquid in the mixing vessel, and including gas inlet means in said drive shaft to enable gas to pass from the overhead gas space to the hollow portion of the drive shaft.

6. The system of claim 1 in which said conduit means comprises conduits affixed to said drive shaft means and extending from above the highest liquid level to be encountered during the gas-liquid mixing operation to the position of said hollow eductor tubes.

7. The system of claim 1 in which two hollow eductor tubes extend radially outward from said drive shaft means.

8. The system of claim 7 in which said hollow eductor tubes are spaced 180° apart.

9. The system of claim 1 in which three hollow eductor tubes extend radially outward from said draft shaft means.

10. The system of claim 9 in which said hollow eductor tubes are spaced 120° apart.

11. The system of claim 1 in which four hollow eductor tubes extend radially outward from said drive shaft means.

12. The system of claim 11 in which said hollow eductor tubes are spaced 90° apart.

13. The system of claim 1 in which said drive shaft means are adapted to rotate said hollow eductor tubes at a tip speed of between 1,500 to 3,000 FPM.

14. The system of claim 13 in which said drive shaft means are adapted to rotate said hollow eductor tubes at a tip speed of between 2,000 and 2,400 FPM.

15. The system of claim 1 in which the outlet ends of said hollow eductor tubes are cut at an angle trailing back from the direction of gas flow therethrough.

16. The system of claim 15 in which the angle of cut is from 30° to 90°.

17. The system of claim 16 in which the angle of cut is about 45°.

18. The system of claim 1 in which the bottom of the draft tube is about one diameter of said draft tube above the bottom of the mixing vessel.

19. An improved system for mixing a gas and a liquid in a mixing vessel under circumstances in which the depth of a body of the liquid changes over the course of the mixing operation comprising:

(a) a mixing vessel for the mixing of a gas and liquid;

(b) an assembly comprising a hollow draft tube with axial flow, down-pumping impeller means positioned therein for vortex development and the ingestion of a gas bubble-liquid mixture for downward passage through the draft tube, said assembly being positioned within the mixing vessel with the impeller means positioned entirely in the lower half thereof, with the bottom of the draft tube being no closer than about ¾ of a diameter of said draft tube above the bottom of the mixing vessel, said assembly being positioned below the lowest liquid level to be encountered during the gas-liquid mixing operation;

(c) drive shaft means extending upward through the mixing vessel and adapted for rotating said assembly to create a circulation of a gas bubble-liquid mixture downward through said hollow draft tube, with discharge of the gas bubble-liquid mixture from the bottom end of the draft tube for passage upward in the annular space between the draft tube and the wall of the mixing vessel;

(d) at least two hollow eductor tubes extending radially outward from said drive shaft means into the body of liquid in the mixing vessel above said assembly, said hollow eductor tubes being spaced apart and located at a distance of ¼ to 1½ times the diameter of the draft tube above the top of the draft tube, said hollow eductor tubes having a total end-to-end length from the outer end of one hollow eductor tube to the outer end of another of from ½ to 1½ times the diameter of the draft tube;

(e) conduit means for providing fluid communication between said hollow eductor tubes and the overhead gas space above the surface of the body of liquid in the mixing vessel at a location above the highest liquid level to be encountered during the gas-liquid mixing operation; and (f) a split draft tube positioned above said assembly in the region of the body of liquid in the mixing vessel between the lowest and the highest liquid level to be encountered during the gas-liquid mixing operation, said split draft tube having openings therein to enable liquid passing upwardly in the mixing vessel to flow into the interior of said split draft tube for recirculation downwardly therein to the vicinity of said assembly, whereby efficient gas-liquid mixing is maintained under variable liquid operating level operations with desirable recirculation of gas from the overhead gas space into the body of liquid.

20. The system of claim 19 in which said hollow eductor tubes are located at a distance of ½ to 1 times the diameter of the draft tube above the top of the draft tube, and said assembly is positioned in the lower third of the mixing vessel.

21. The system of claim 19 in which said split draft tube has axial, upwardly extending splits therein comprising said openings for the passage of liquid therethrough.

22. The system of claim 21 in which said split draft tube has two axial, upwardly extending splits on opposite sides thereof.

* * * * *